(12) United States Patent
Lee (10) Patent No.: US 10,449,934 B2
(45) Date of Patent: Oct. 22, 2019

(54) PEDAL DISPLACEMENT SENSOR AND ELECTRONIC BRAKE SYSTEM COMPRISING THE SAME

(71) Applicant: MANDO CORPORATION, Gyeonggi-do (KR)

(72) Inventor: Hye-Won Lee, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/913,905

(22) Filed: Mar. 6, 2018

(65) Prior Publication Data
US 2018/0257614 A1    Sep. 13, 2018

(30) Foreign Application Priority Data

Mar. 8, 2017 (KR) .................. 10-2017-0029320

(51) Int. Cl.
*B60T 7/04* (2006.01)
*G01D 5/14* (2006.01)
*F16D 66/00* (2006.01)

(52) U.S. Cl.
CPC ............. *B60T 7/042* (2013.01); *B60T 7/04* (2013.01); *G01D 5/14* (2013.01); *G01D 5/145* (2013.01); *B60T 2220/04* (2013.01); *F16D 2066/003* (2013.01)

(58) Field of Classification Search
CPC .......... B60T 7/042; B60T 7/04; B60T 8/4086; B60T 8/4266; B60T 8/4081; B60Q 1/441; G01D 5/147; G01D 5/145; G01D 5/2515; F16D 2066/003
See application file for complete search history.

(56) References Cited

U.S. PATENT DOCUMENTS

| | | | | |
|---|---|---|---|---|
| 4,818,036 A | * | 4/1989 | Reinecke | B60T 7/042 188/156 |
| 5,439,275 A | * | 8/1995 | Padula | B60T 15/14 188/158 |
| 6,267,200 B1 | * | 7/2001 | Barthalow | B66C 23/42 182/2.9 |
| 7,166,996 B2 | * | 1/2007 | Godkin | G01D 5/145 324/207.2 |
| 7,893,688 B2 | * | 2/2011 | Kawashima | G01D 5/145 324/207.23 |

(Continued)

FOREIGN PATENT DOCUMENTS

| CN | 102564466 | 7/2015 |
|---|---|---|
| JP | 2003-524778 | 8/2003 |
| KR | 10-1220609 | 1/2013 |

*Primary Examiner* — Bradley T King
*Assistant Examiner* — Mahbubur Rashid
(74) *Attorney, Agent, or Firm* — Ladas & Parry, LLP (57) ABSTRACT

Disclosed herein are a pedal displacement sensor and an electronic brake system including the pedal displacement sensor. The pedal displacement sensor includes a magnet to be movable, a first electrical steel plate including one end spaced apart from an upper side of the magnet and one surface to face the magnet, a second electrical steel plate including one end spaced apart from a lower side of the magnet and the other end spaced apart from the other end of the first electrical steel plate, and a magnetic sensor to measure a magnetic flux between the other end of the first electrical steel plate and the second electrical steel plate.

12 Claims, 4 Drawing Sheets

(56) References Cited

U.S. PATENT DOCUMENTS

| | | | |
|---|---|---|---|
| 8,978,457 B2* | 3/2015 | Naether | B60T 7/042 73/129 |
| 9,566,964 B2 | 2/2017 | Jürgens | |
| 2002/0067260 A1* | 6/2002 | Tajima | H03K 17/9515 340/551 |
| 2002/0117893 A1* | 8/2002 | Shaw | B60T 7/042 303/113.4 |
| 2003/0075975 A1* | 4/2003 | Fulks | B60Q 1/44 303/113.4 |
| 2003/0205931 A1* | 11/2003 | Muller | B60Q 1/441 303/20 |
| 2012/0304799 A1* | 12/2012 | Noh | B60K 26/021 74/512 |
| 2013/0213034 A1* | 8/2013 | Leiber | B60T 7/042 60/534 |
| 2014/0331758 A1* | 11/2014 | Sim | B60T 7/042 73/132 |
| 2015/0070003 A1* | 3/2015 | Elliott | B60T 8/368 324/207.15 |
| 2015/0158466 A1* | 6/2015 | Nakamura | B60T 11/16 303/3 |
| 2015/0219433 A1* | 8/2015 | Kato | G01D 5/145 324/207.13 |
| 2015/0362307 A1* | 12/2015 | Sim | G01R 33/0047 324/207.13 |
| 2016/0016567 A1* | 1/2016 | Jurgens | B60T 7/042 303/10 |
| 2017/0001615 A1* | 1/2017 | Adler | B60T 7/042 |

* cited by examiner

PEDAL DISPLACEMENT SENSOR AND ELECTRONIC BRAKE SYSTEM COMPRISING THE SAME

CROSS-REFERENCE TO RELATED APPLICATION

This application claims the benefit of Korean Patent Application No. 2017-0029320, filed on Mar. 8, 2017 in the Korean Intellectual Property Office, the disclosure of which is incorporated herein by reference.

BACKGROUND

1. Field

Embodiments of the present disclosure relate to a pedal displacement sensor and an electronic brake system including the same.

2. Description of the Related Art

Brake systems for braking are installed in vehicles, and recently, various kinds of systems have been suggested to obtain more strong and stable braking force.

Generally, an electronic brake system includes a hydraulic pressure supply apparatus configured to receive an electric signal of a braking intention of a driver from a pedal displacement sensor configured to detect a displacement of a brake pedal when the driver steps on the brake pedal and to transmit a pressure to wheel cylinders.

The pedal displacement sensor measures a pedal effort applied to the brake pedal by the driver and transmits the pedal effort to an electronic control unit, and since a conventional pedal displacement sensor has a complex structure, difficulties arise in that a separate printed circuit board is used in addition to other parts of the electronic brake system, or a conventional pedal displacement sensor is difficult to package with the other parts.

SUMMARY

Therefore, it is an aspect of the present disclosure to provide a pedal displacement sensor capable of effectively measuring a displacement of a brake pedal having a simple structure and an electronic brake system including the same.

According to an aspect of an exemplary embodiment, there is provided a pedal displacement sensor including a magnet to be movable, a first electrical steel plate including one end spaced apart from an upper side of the magnet and one surface to face the magnet, a second electrical steel plate including one end spaced apart from a lower side of the magnet and the other end spaced apart from the other end of the first electrical steel plate, and a magnetic sensor to measure a magnetic flux between the other end of the first electrical steel plate and the second electrical steel plate.

The second electrical steel plate may include one flat surface to face the magnet.

The magnet is able to be moved transversally by a pedal effort from a driver.

The magnetic sensor may measure a large magnetic flux as the magnet moves leftward.

One pole of the magnet may face the one surface of the first electrical steel plate, and the other pole of the magnet may face one surface of the second electrical steel plate.

The one surface of the first electrical steel plate may be inclined such that a distance between the one surface of the first electrical steel plate and the magnet increases rightward.

The pedal displacement sensor may further include a printed circuit board on which the magnetic sensor is mounted.

According to an aspect of another exemplary embodiment, there is provided an electronic brake system including a brake pedal, a pedal displacement sensor to measure a pedal effort applied to the brake pedal by a driver, and an electronic control unit to drive a motor on the basis of a measurement result of the pedal displacement sensor. The pedal displacement sensor includes a magnet to be able to be moved by the pedal effort from the driver, a first electrical steel plate including one end spaced apart from an upper side of the magnet and one inclined surface to face the magnet, a second electrical steel plate including one end spaced apart from a lower side of the magnet and the other end spaced apart from the other end of the first electrical steel plate, and a magnetic sensor to measure a magnetic flux between the other end of the first electrical steel plate and the second electrical steel plate.

The second electrical steel plate may include one flat surface to face the magnet.

The magnet is able to be moved transversally by the pedal effort from the driver.

The magnetic sensor may measure a large magnetic flux as the magnet moves leftward.

One pole of the magnet faces the one surface of the first electrical steel plate, and the other pole of the magnet faces one surface of the second electrical steel plate.

The one surface of the first electrical steel plate may be inclined such that a distance between the one surface of the first electrical steel plate and the magnet increases as the magnet moves rightward.

The pedal displacement sensor may further include a printed circuit board on which the magnetic sensor and the electronic control unit are mounted.

BRIEF DESCRIPTION OF THE DRAWINGS

The patent or application file contains at least one drawing executed in color. Copies of this patent or patent application publication with color drawings will be provided by the Office upon request and payment of the necessary fee.

These above and/or other aspects of the disclosure will become apparent and more readily appreciated from the following description of exemplary embodiments, taken in conjunction with the accompanying drawings in which.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

Figure 1:
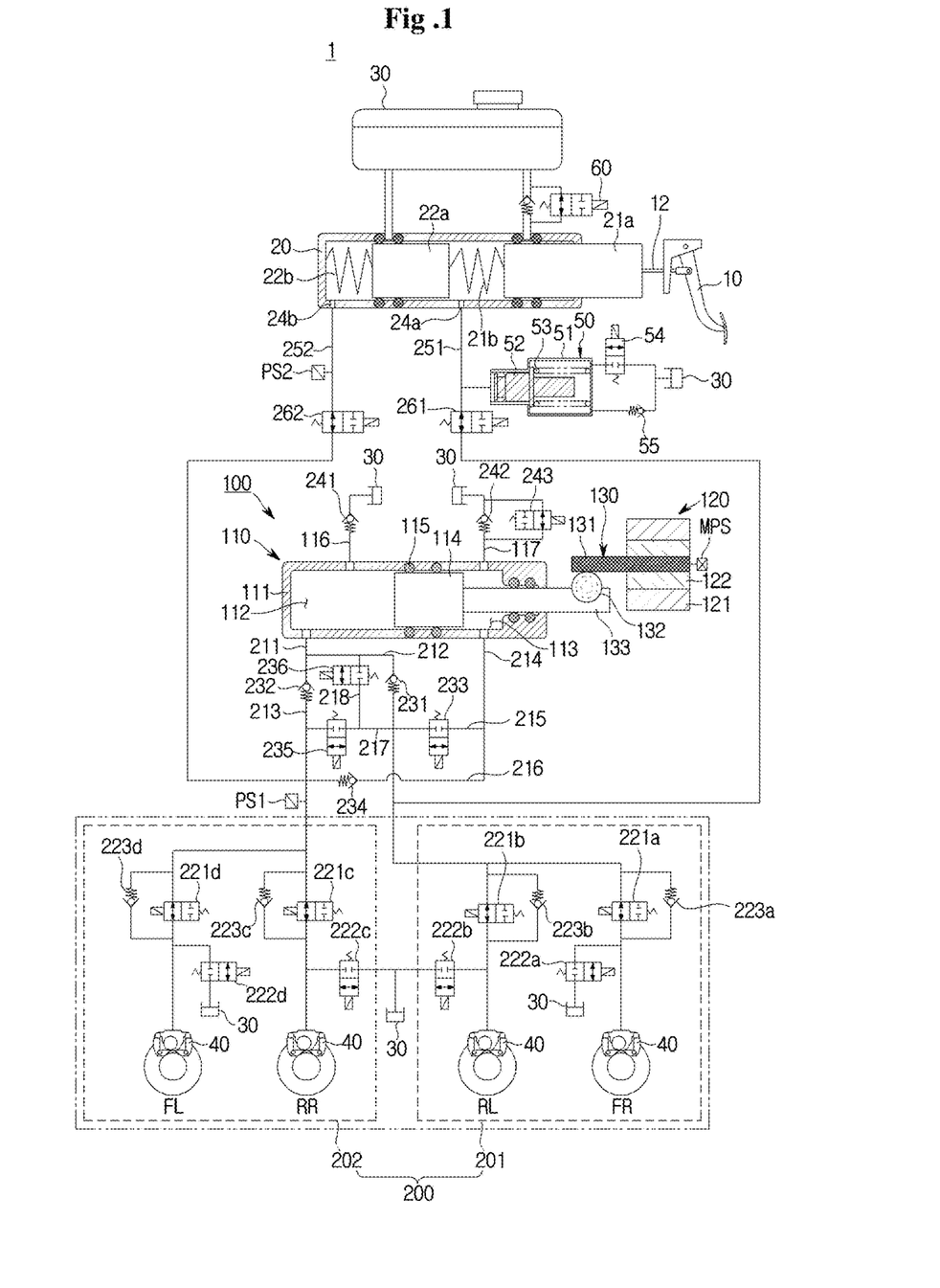
FIG. 1 is a hydraulic circuit diagram showing a state of an electronic brake system 1 according to one embodiment during non-braking.

FIG. 1 is a hydraulic circuit diagram showing a state of an electronic brake system 1 according to one embodiment during non-braking.

Referring to FIG. 1, the electronic brake system 1 generally includes a master cylinder 20 configured to generate a hydraulic pressure, a reservoir 30 coupled to an upper portion of the master cylinder 20 and configured to store oil, an input rod 12 configured to apply pressure to the master cylinder 20 according to a pedal effort from the brake pedal 10, wheel cylinders 40 configured to receive a hydraulic pressure and perform braking of vehicle wheels RR, RL, FR, and FL, and a simulation apparatus 50 configured to provide a reaction force according to a pedal effort from the brake pedal 10.

In addition, although not illustrated in FIG. 1, wheel speed sensors may be provided at the wheel cylinders 40 and may measure speeds of the wheels FL, RR, RL, and FR.

The master cylinder 20 may include at least one chamber and generate a hydraulic pressure. As an example, the master cylinder 20 may include two chambers, a first piston 21a and a second piston 22a are included in each of the chambers, and the first piston 21a may be connected to the input rod 12. In addition, the master cylinder 20 may include first and second hydraulic pressure ports 24a and 24b through which a hydraulic pressure is transmitted from the two chambers.

Meanwhile, since the master cylinder 20 includes two chambers, safety may be secured when a failure occurs. For example, one chamber of the two chambers may be connected to a right front-wheel FR and a left rear-wheel RL, and the other chamber may be connected to a left front-wheel FL and a right rear-wheel RR. As described above, since the two chambers are independently provided, even when one chamber fails, the vehicle may be braked.

In addition, a first spring 21b may be provided between the first piston 21a and the second piston 22a of the master cylinder 20, and a second spring 22b may be provided between the second piston 22a and an end of the master cylinder 20.

The first spring 21b and the second spring 22b are provided in each of the two chambers, and an elastic force is accumulated in the first spring 21b and the second spring 22b while the first piston 21a and the second piston 22a are compressed while a displacement of the brake pedal 10 is changed. In addition, when a force which pushes the first piston 21a is less than the elastic force, the first spring 21b and the second spring 22b may push the first and second pistons 21a and 22a using the elastic force accumulated therein and return the first and second pistons 21a and 22a to the original state.

A pedal displacement sensor 300 (see FIG. 2) configured to detect a displacement of the brake pedal 10 may be provided adjacent to one end of at least any one of the first piston 21a and the second piston 22a of the master cylinder 20. The pedal displacement sensor 300 will be described in detail below.

Meanwhile, the input rod 12 configured to apply pressure to the first piston 21a of the master cylinder 20 may be in direct contact with the first piston 21a. That is, a gap between the master cylinder 20 and the input rod 12 may not be present. Accordingly, when a driver steps on the brake pedal 10, the input rod 12 may directly apply pressure to the master cylinder 20, without a dead pedal stroke section.

The simulation apparatus 50 may be connected to a first back-up path 251, which will be described below, and provide a reaction force according to a pedal effort from the brake pedal 10. Since a reaction force proportional to the pedal effort supplied by a driver is provided, the driver may minutely adjust a braking force according to an intention of the driver.

Referring to FIG. 1, the simulation apparatus 50 includes a pedal simulator having a simulation chamber 51 configured to store oil discharged from the first hydraulic pressure port 24a of the master cylinder 20, a reaction force piston 52 provided in the simulation chamber 51, and a reaction force spring 53 configured to elastically support the reaction force piston 52 and includes a simulator valve 54 connected to a rear end of the simulation chamber 51.

The reaction force piston 52 and the reaction force spring 53 are installed to have displacements within a predetermined range in the simulation chamber 51 by oil introduced into the simulation chamber 51.

The simulator valve 54 may be provided on a path configured to connect the rear end of the simulation chamber 51 with the reservoir 30. A front end of the simulation chamber 51 may be connected to the master cylinder 20, and the rear end of the simulation chamber 51 may be connected to the reservoir 30 through the simulator valve 54. Accordingly, even in a case in which the reaction force piston 52 is returned to an original location, since oil of the reservoir 30 is introduced through the simulator valve 54, an entire inside of the simulation chamber 51 may be filled with the oil.

Meanwhile, a plurality of reservoirs 30 are illustrated in the drawing and all the reservoirs 30 are referred to using the same numeral. However, the reservoirs may be formed with the same part or different parts. As an example, a reservoir 30 connected to the simulation apparatus 50 may be the same as a reservoir 30 connected to the master cylinder 20 or may be a reservoir capable of storing oil in addition to the reservoir 30 connected to the master cylinder 20.

Meanwhile, the simulator valve 54 may be formed as a normal closed type solenoid valve configured to normally be kept a closed state. In a case in which a driver applies a pedal effort to the brake pedal 10, the simulator valve 54 may be opened so that oil in the simulation chamber 51 may be transmitted to the reservoir 30.

In addition, a simulator check valve 55 may be installed between the pedal simulator and the reservoir 30 to be connected to the simulator valve 54 in parallel. The simulator check valve 55 may allow oil in the reservoir 30 to flow toward the simulation chamber 51 but may block the oil in the simulation chamber 51 from flowing to the reservoir 30 through a path in which the check valve 55 is installed. When a pedal effort is released from the brake pedal 10, since oil may be supplied to the simulation chamber 51 through the simulator check valve 55, a pressure of the pedal simulator may be securely quickly restored.

A hydraulic pressure supply apparatus 100 may include a hydraulic pressure supply unit 110 configured to provide an oil pressure transmitted to the wheel cylinders 40, a motor 120 configured to generate a rotational force due to an electric signal of the pedal displacement sensor 300, and a power converter 130 configured to convert a rotational motion of the motor 120 into a linear motion and transmit the linear motion to the hydraulic pressure supply unit 110. Alternatively, the hydraulic pressure supply unit 110 may also be operated by a pressure supplied by a high pressure accumulator and not by a driving force supplied by the motor 120.

The electronic brake system 1 according to one embodiment may include the hydraulic pressure supply apparatus 100 configured to receive an electrical signal of a braking intention of a driver from the pedal displacement sensor 300, which is configured to detect a displacement of the brake pedal 10, and mechanically operate, a hydraulic control unit 200 formed with first and second hydraulic circuits 201 and 202 each provided for two wheels among the vehicle wheels RR, RL, FR, and FL and configured to control a flow of a hydraulic pressure transmitted to the wheel cylinders 40, a first cut valve 261 provided on the first back-up path 251 configured to connect the first hydraulic pressure port 24*a* with the first hydraulic circuit 201 and control a flow of a hydraulic pressure, a second cut valve 262 provided on a second back-up path 252 configured to connect the second hydraulic pressure port 24*b* with the second hydraulic circuit 202 and control a flow of a hydraulic pressure, and an electronic control unit 2000 configured to control the hydraulic pressure supply apparatus 100 and valves 54, 60, 221*a*, 221*b*, 221*c*, 221*d*, 222*a*, 222*b*, 222*c*, 222*d*, 233, 235, 236, and 243 on the basis of hydraulic pressure information and pedal displacement information.

The electronic control unit 2000 may be formed with a memory (not shown) configured to store data of an algorithm configured to generally control the electronic brake system 1 or a program configured to realize the algorithm and a processor (not shown) configured to perform an operation needed to control the electronic brake system 1 using the data stored in the memory. Here, the memory and the processor may be formed as individual chips. Alternatively, the memory and the processor may also be formed as a single chip.

The hydraulic pressure supply unit 110 includes a cylinder block 111 in which a pressure chamber configured to receive and store oil is formed, a hydraulic piston 114 accommodated in the cylinder block 111, a sealing member 115 (115*a* and 115*b*) provided between the hydraulic piston 114 and the cylinder block 111 and configured to seal the pressure chamber, and a driving shaft 133 connected to a rear end of the hydraulic piston 114 and configured to transmit power output from the power converter 130 to the hydraulic piston 114.

The pressure chamber may include a first pressure chamber 112 located in front of the hydraulic piston 114 (in a forward direction thereof and in a leftward direction in the drawing) and a second pressure chamber 113 located behind the hydraulic piston 114 (in a backward direction thereof and in a rightward direction in the drawing). That is, the first pressure chamber 112 is defined by the cylinder block 111 and a front end of the hydraulic piston 114, a volume of the first pressure chamber 112 is changed according to movement of the hydraulic piston 114, the second pressure chamber 113 is defined by the cylinder block 111 and a rear end of the hydraulic piston 114, and a volume of the second pressure chamber 113 is changed according to movement of the hydraulic piston 114.

The first and second pressure chambers 112 and 113 may be connected to the reservoir 30 through dump paths 116 and 117, respectively, and may receive oil from the reservoir 30 and store the oil or may transmit oil of the first or second pressure chamber 112 or 113 to the reservoir 30.

Next, paths 211, 212, 213, 214, 215, 216, and 217 and valves 231, 232, 233, 234, 235, 236, 241, 242, and 243 connected to the first pressure chamber 112 and the second pressure chamber 113 will be described below.

A second hydraulic path 212 may communicate with the first hydraulic circuit 201, and a third hydraulic path 213 may communicate with the second hydraulic circuit 202. Accordingly, a hydraulic pressure may be transmitted to the first hydraulic circuit 201 and the second hydraulic circuit 202 by the hydraulic piston 114 being moved forward.

In addition, the electronic brake system 1 according to one embodiment may include a first control valve 231 and a second control valve 232 provided, respectively, in the second and third hydraulic paths 212 and 213 and each configured to control an oil flow.

In addition, the first and second control valves 231 and 232 may be provided as check valves each configured to allow an oil flow in a direction going from the first pressure chamber 112 toward the first or second hydraulic circuit 201 or 202 and block an oil flow in a direction opposite the above-described direction. That is, the first or second control valve 231 or 232 may allow a hydraulic pressure of the first pressure chamber 112 to be transmitted to the first or second hydraulic circuit 201 or 202 and prevent a hydraulic pressure of the first or second hydraulic circuit 201 or 202 from leaking to the first pressure chamber 112 through the second or third hydraulic path 212 and 213.

Meanwhile, a fourth hydraulic path 214 may be branched into a fifth hydraulic path 215 and a sixth hydraulic path 216 and communicate with both the first hydraulic circuit 201 and the second hydraulic circuit 202. As an example, the fifth hydraulic path 215 branched from the fourth hydraulic path 214 may communicate with the first hydraulic circuit 201, and the sixth hydraulic path 216 branched from the fourth hydraulic path 214 may communicates with the second hydraulic circuit 202. Accordingly, a hydraulic pressure may be transmitted to both the first hydraulic circuit 201 and the second hydraulic circuit 202 by the hydraulic piston 114 being moved backward.

In addition, the electronic brake system 1 according to one embodiment may include a third control valve 233 provided on the fifth hydraulic path 215 and configured to control an oil flow and a fourth control valve 234 provided on the sixth hydraulic path 216 and configured to control an oil flow.

The third control valve 233 may be provided as a bidirectional control valve configured to control an oil flow between the second pressure chamber 113 and the first hydraulic circuit 201. In addition, the third control valve 233 may be provided as a normally closed type solenoid valve configured to normally be closed and to open upon receiving an opening signal from the electronic control unit 2000.

In addition, the fourth control valve 234 may be formed as a check valve configured to allow an oil flow from the second pressure chamber 113 toward the second hydraulic circuit 202 and block an oil flow in a direction opposite the above-descried direction. That is, the fourth control valve 234 may prevent a hydraulic pressure of the second hydraulic circuit 202 from leaking to the second pressure chamber 113 through the sixth hydraulic path 216 and the fourth hydraulic path 214.

In addition, the electronic brake system 1 according to one embodiment may include a fifth control valve 235 provided on a seventh hydraulic path 217 configured to connect the second hydraulic path 212 with the third hydraulic path 213 and configured to control an oil flow, and may include a sixth control valve 236 provided on an eighth hydraulic path 218 configured to connect the second hydraulic path 212 with the seventh hydraulic path 217 and configured to control an oil flow. In addition, the fifth control valve 235 and the sixth control valve 236 may be provided as normally closed type solenoid valves each configured to normally be closed and to open upon receiving an opening signal from the electronic control unit.

When an abnormality occurs at the first control valve 231 or the second control valve 232, the fifth control valve 235 and the sixth control valve 236 may be opened so that a hydraulic pressure of the first pressure chamber 112 may be transmitted to both the first hydraulic circuit 201 and the second hydraulic circuit 202.

In addition, the fifth control valve 235 and the sixth control valve 236 may be opened when a hydraulic pressure of the wheel cylinder 40 is received and transmitted to the first pressure chamber 112. This is because the first control valve 231 and the second control valve 232 provided, respectively, on the second hydraulic path 212 and the third hydraulic path 213 are provided as check valves each configured to allow an oil flow in one direction.

In addition, the electronic brake system 1 according to one embodiment may further include a first dump valve 241 and a second dump valve 242 provided, respectively, on the first and second dump paths 116 and 117 and each configured to control an oil flow. The dump valves 241 and 242 may be check valves each configured to be opened in a direction going from the reservoir 30 toward the first or second pressure chamber 112 or 113 and to be closed in a direction opposite the above-described direction. That is, the first dump valve 241 may be a check valve configured to allow oil to flow from the reservoir 30 toward the first pressure chamber 112 and block the oil from flowing from the first pressure chamber 112 toward the reservoir 30, and the second dump valve 242 may be a check valve configured to allow oil to flow from the reservoir 30 toward the second pressure chamber 113 and block the oil from flowing from the second pressure chamber 113 toward the reservoir 30.

In addition, the second dump path 117 may include a bypass path, and a third dump valve 243 configured to control an oil flow between the second pressure chamber 113 and the reservoir 30 may be installed on the bypass path.

The third dump valve 243 may be provided as a solenoid valve capable of controlling a bidirectional flow and provided as a normally open type solenoid valve configured to normally be open and to close upon receiving a closing signal from the electronic control unit.

The hydraulic pressure supply unit 110 of the electronic brake system 1 according to one embodiment may operate as a type of double cylinder. That is, a hydraulic pressure generated at the first pressure chamber 112 by the hydraulic piston 114 being moved forward may be transmitted to the first hydraulic circuit 201 through the first hydraulic path 211 and the second hydraulic path 212 to operate the wheel cylinders 40 installed at the right front-wheel FR and the left rear-wheel RL, and may be transmitted to the second hydraulic circuit 202 through the first hydraulic path 211 and the third hydraulic path 213 to operate the wheel cylinders 40 installed at the right rear-wheel RR and the left front-wheel FL.

Similarly, a hydraulic pressure generated at the second pressure chamber 113 by the hydraulic piston 114 being moved backward may be transmitted to the first hydraulic circuit 201 through the fourth hydraulic path 214 and the fifth hydraulic path 215 to operate the wheel cylinders 40 installed at the right front-wheel FR and the left rear-wheel RL, and may be transmitted to the second hydraulic circuit 202 through the fourth hydraulic path 214 and the sixth hydraulic path 216 to operate the wheel cylinders 40 installed at the right rear-wheel RR and the left front-wheel FL.

In addition, a negative pressure generated at the first pressure chamber 112 by the hydraulic piston 114 being moved backward may absorb oil of the wheel cylinders 40 installed at the right front-wheel FR and the left rear-wheel RL to transmit the oil to the first pressure chamber 112 through the first hydraulic circuit 201, the second hydraulic path 212, and the first hydraulic path 211, and may absorb oil of the wheel cylinders 40 installed at the right rear-wheel RR and the left front-wheel FL to transmit the oil to the first pressure chamber 112 through the second hydraulic circuit 202, the third hydraulic path 213, and the first hydraulic path 211.

Next, the motor 120 and the power converter 130 of the hydraulic pressure supply apparatus 100 will be described.

The motor 120 may be an apparatus configured to generate a rotational force according to a signal output from the electronic control unit 2000 and generate a rotational force in a forward or backward direction. A rotational angular velocity and a rotational angle of the motor 120 may be precisely controlled.

In addition, a motor position sensor (MPS) is a motor control sensor configured to control a rotational angle or current of the motor 120.

That is, the hydraulic pressure supply apparatus 100 may further include the MPS for measuring the rotational angular velocity and the rotational angle of the motor 120 and transmit rotational angle information and other position information of the motor 120 to the electronic control unit 2000.

Meanwhile, the electronic control unit 2000 controls the motor 120 and the valves 54, 60, 221a, 221b, 221c, 221d,

222*a*, 222*b*, 222*c*, 222*d*, 233, 235, 236, and 243 forming a plurality of valves 800 which will be described below and are included in the electronic brake system 1 according to one embodiment.

Besides, operation of the electronic control unit 2000 in which a plurality of valves are controlled according to a displacement of the brake pedal 10 will be described below.

A driving force of the motor 120 causes a displacement of the hydraulic piston 114 via the power converter 130, and a hydraulic pressure generated by the hydraulic piston 114 sliding in the pressure chamber is transmitted to the wheel cylinders 40 installed at the vehicle wheels RR, RL, FR, and FL through the first and second hydraulic paths 211 and 212.

The power converter 130 may be an apparatus configured to convert a rotational force into a linear motion and provided with, as an example, a worm shaft 131, a worm wheel 132, and the driving shaft 133.

That is, a signal detected by the pedal displacement sensor 300 when a displacement of the brake pedal 10 occurs is transmitted to the electronic control unit 2000, and the electronic control unit 2000 drives the motor 120 in one direction to rotate the worm shaft 131 in one direction. A rotational force of the worm shaft 131 is transmitted to the driving shaft 133 through the worm wheel 132, and a hydraulic pressure is generated at the first pressure chamber 112 by the forward movement of the hydraulic piston 114 connected to the driving shaft 133.

Conversely, when a pedal effort is removed from the brake pedal 10, the electronic control unit 2000 drives the motor 120 in a direction opposite the above-described direction so that the worm shaft 131 is rotated in a direction opposite the above-described direction. Accordingly, the worm wheel 132 is also reversely rotated, and the hydraulic piston 114 connected to the driving shaft 133 is returned (while moving backward) so that a negative pressure is generated at the first pressure chamber 112.

Meanwhile, generation of hydraulic pressure and negative pressure is also possible in a direction opposite the above-described direction. That is, when a displacement occurs at the brake pedal 10, a signal detected by the pedal displacement sensor 300 is transmitted to the electronic control unit 2000, and the electronic control unit 2000 drives the motor 120 in a direction opposite the above-described direction so that the worm shaft 131 is rotated in a direction opposite the above-described direction. A rotational force of the worm shaft 131 is transmitted to the driving shaft 133 through the worm wheel 132, and a hydraulic pressure is generated at the second pressure chamber 113 by the backward movement of the hydraulic piston 114 connected to the driving shaft 133.

Conversely, when a pedal effort is removed from the brake pedal 10, the electronic control unit 2000 drives the motor 120 in one direction so that the worm shaft 131 is rotated in one direction. Accordingly, the worm wheel 132 is also rotated in a direction opposite the above-described direction, and the hydraulic piston 114 connected to the driving shaft 133 is returned (while being moved forward) so that a negative pressure is generated at the second pressure chamber 113.

As described above, the hydraulic pressure supply apparatus 100 serves to transmit a hydraulic pressure to the wheel cylinder 40 according to a rotational direction of a rotational force generated by the motor 120 or to absorb the hydraulic pressure and transmit the hydraulic pressure to the reservoir 30.

Meanwhile, in a case in which the motor 120 rotates in one direction, a hydraulic pressure may be generated at the first pressure chamber 112, or a negative pressure may be generated at the second pressure chamber 113. In this case, whether braking has to be performed using the hydraulic pressure or braking has to be released using the negative pressure may be determined by controlling the valves 54, 60, 221*a*, 221*b*, 221*c*, 221*d*, 222*a*, 222*b*, 222*c*, 222*d*, 233, 235, 236, and 243 forming the plurality of valves 800.

In addition, it has to be understood that the power converter 130 according to one embodiment may have, in addition to a structure of a ball screw nut assembly, any structure capable of converting a rotational motion into a linear motion.

The first cut valve 261 configured to control an oil flow may be provided on the first back-up path 251, and the second cut valve 262 configured to control an oil flow may be provided on the second back-up path 252. In addition, the first back-up path 251 may connected the first hydraulic pressure port 24*a* and the first hydraulic circuit 201, and the second back-up path 252 may be connected to the second hydraulic pressure port 24*b* and the second hydraulic circuit 202.

In addition, the first and second cut valves 261 and 262 may be provided as normal open type solenoid valves each configured to normally be open and to close upon receiving a closing signal from the electronic control unit.

Next, the hydraulic control unit 200 according to one embodiment will be described.

The hydraulic control unit 200 may be formed with the first hydraulic circuit 201 and the second hydraulic circuit 202 each configured to receive a hydraulic pressure and control the two vehicle wheels. As an example, the first hydraulic circuit 201 may control the right front-wheel FR and the left rear-wheel RL, and the second hydraulic circuit 202 may control the left front-wheel FL and the right rear-wheel RR. In addition, the wheel cylinder 40 is installed at each of the vehicle wheels FR, FL, RR, and RL and receives a hydraulic pressure so that braking is performed.

The first hydraulic circuit 201 is connected to the first hydraulic path 211 and the second hydraulic path 212 and receives a hydraulic pressure from the hydraulic pressure supply apparatus 100, and the second hydraulic path 212 is branched into two paths connected to the right front-wheel FR and the left rear-wheel RL. Similarly, the second hydraulic circuit 202 is connected to the first hydraulic path 211 and the third hydraulic path 213 and receives a hydraulic pressure from the hydraulic pressure supply apparatus 100, and the third hydraulic path 213 is branched into two paths connected to the left front-wheel FL and the right rear-wheel RR.

The hydraulic circuits 201 and 202 may include a plurality of inlet valves 221 (221*a*, 221*b*, 221*c*, and 221*d*) to control a flow of hydraulic pressure. As an example, two inlet valves 221*a* and 221*b* connected to the first hydraulic path 211 and configured to control hydraulic pressures transmitted to two wheel cylinders 40 may be provided in the first hydraulic circuit 201. In addition, two inlet valves 221*c* and 221*d* connected to the second hydraulic path 212 and configured to control hydraulic pressures transmitted to the wheel cylinders 40 may be provided in the second hydraulic circuit 202

In addition, the inlet valves 221 may be disposed at an upstream side of the wheel cylinders 40 and provided as normally open type solenoid valves each configured to normally be open and to close upon receiving a closing signal from the electronic control unit 2000.

In addition, the hydraulic circuits 201 and 202 may include check valves 223*a*, 223*b*, 223*c*, and 223*d* provided on bypass paths configured to connect front and rear ends of the inlet valves 221a, 221b, 221c, and 221d. The check valves 223a, 223b, 223c, and 223d may each be provided to allow an oil flow from the wheel cylinder 40 toward the hydraulic pressure supply unit 110 and restrict an oil flow from the hydraulic pressure supply unit 110 toward the wheel cylinders 40. The check valves 223a, 223b, 223c, and 223d may allow brake pressures of the wheel cylinders 40 to be quickly removed and allow hydraulic pressures of the wheel cylinders 40 to be introduced into the hydraulic pressure supply unit 110 in a case in which the inlet valves 221a, 221b, 221c, and 221d are not operated normally.

In addition, the hydraulic circuits 201 and 202 may further include a plurality of outlet valves 222 (222a, 222b, 222c, and 222d) which are connected to the reservoir 30 for improving performance thereof when braking is released. The outlet valves 222 are connected to the wheel cylinders 40 and control hydraulic pressures so that the hydraulic pressures are removed from the vehicle wheels RR, RL, FR, and FL. That is, the outlet valves 222 may detect brake pressures of the vehicle wheels RR, RL, FR, and FL and control the pressures by selectively opening the valves in a case in which reduced pressure braking is needed.

In addition, the outlet valves 222 may be provided as normally closed type solenoid valves configured to normally be closed and open upon receiving an opening signal from the electronic control unit.

In addition, the hydraulic control unit 200 may be connected to the back-up paths 251 and 252. As an example, the first hydraulic circuit 201 may be connected to the first back-up path 251 and receive a hydraulic pressure from the master cylinder 20, and the second hydraulic circuit 202 may be connected to the second back-up path 252 and receive a hydraulic pressure from the master cylinder 20.

Here, the first back-up path 251 may be merged with the first hydraulic circuit 201 at an upstream side of the first and second inlet valves 221a and 221b. Similarly, the second back-up path 252 may be merged with the second hydraulic circuit 202 at an upstream side of the third and fourth inlet valves 221c and 221d. Accordingly, in a case in which the first and second cut valves 261 and 262 are closed, a hydraulic pressure provided by the hydraulic pressure supply apparatus 100 may be supplied to the wheel cylinders 40 through the first and second hydraulic circuits 201 and 202, and in a case in which the first and second cut valves 261 and 262 are opened, a hydraulic pressure provided by the master cylinder 20 may be supplied to the wheel cylinders 40 through the first and second back-up paths 251 and 252. Here, since the plurality of inlet valves 221a, 221b, 221c, and 221d are in an open state, an operation state thereof does not need to be changed.

Figure 2:
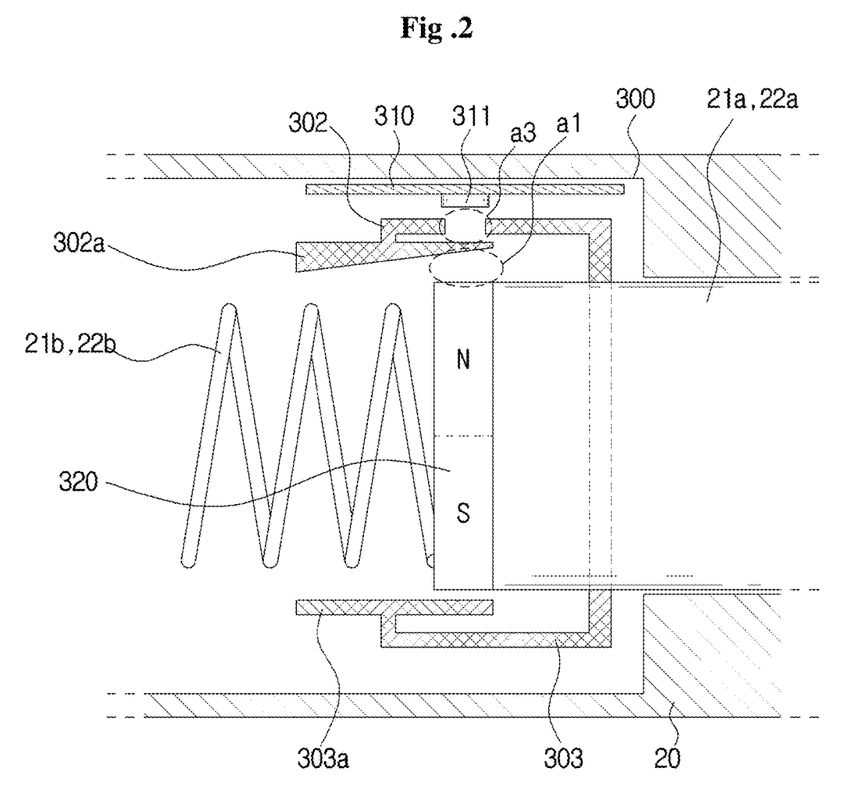
FIG. 2 is an inside view of the pedal displacement sensor according to one embodiment in a state in which a pedal effort has not been applied to the brake pedal during non-braking.
Figure 3:
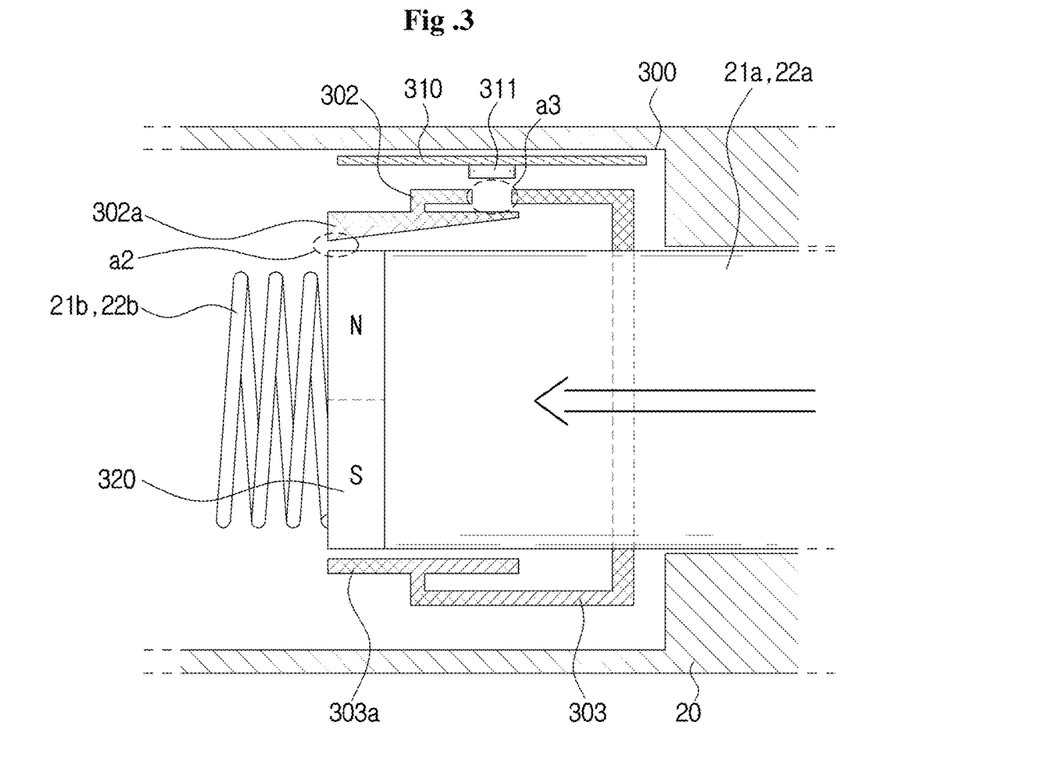
FIG. 3 is an inside view of the pedal displacement sensor according to one embodiment in a braking state in which a pedal effort has been applied to the brake pedal during braking.

Hereinafter, a detailed configuration of the pedal displacement sensor 300 according to one embodiment will be described with reference to FIGS. 2 and 3. FIG. 2 is an inside view of the pedal displacement sensor according to one embodiment in a state in which a pedal effort has not been applied to the brake pedal during non-braking, and FIG. 3 is an inside view of the pedal displacement sensor according to one embodiment in a braking state in which a pedal effort has been applied to the brake pedal during braking.

The pedal displacement sensor 300 according to one embodiment includes a printed circuit board 310, a magnetic sensor 311, a first electrical steel plate 302, a second electrical steel plate 303, and a magnet 320.

The magnet 320 may be provided at one end of at least one of the first piston 21a and the second piston 22a. An upper side and a lower side of the magnet 320 may have different polarities.

The magnet 320 may be provided as an electromagnet in which magnetization is maintained while the electronic brake system 1 is driven or a permanent magnet.

Since the magnet 320 is provided at the one end of the at least one of the first piston 21a and the second piston 22a, in a case in which a pedal effort is applied to the brake pedal 10 by a driver, the magnet 320 may move leftward, and in a case in which the pedal effort is removed therefrom, the magnet 320 may move rightward due to elastic forces of the elastic parts 21b and 22b.

The first electrical steel plate 302 and the second electrical steel plate 303 may include magnetic bodies, for example, ferromagnetic bodies having a magnetic permeability of one or more, magnetized by the magnet 320. The first electrical steel plate 302 and the second electrical steel plate 303 may be strongly magnetized as the first electrical steel plate 302 and the second electrical steel plate 303 are close to the magnet 320.

One end 302a of the first electrical steel plate 302 may be separated form one pole provided at an upper side of the magnet 320, and one surface of the first electrical steel plate 302 facing the magnet 320 may be inclined. In this case, the one surface of the first electrical steel plate 302 facing the magnet 320 may be inclined such that distances a1 and a2 (a2<a1) between the first electrical steel plate 302 and the magnet 320 increase as the magnet 320 moves rightward. Although the one surface of the first electrical steel plate 302 may also be inclined in a direction opposite the above-described direction, the example of the one surface of the first electrical steel plate 302 being inclined like in FIGS. 2 and 3 will be described for the sake of convenience of description.

One end 303a of the second electrical steel plate 303 is separated from one pole provided at a lower side of the magnet 320, and one surface of the second electrical steel plate 303 facing the magnet 320 may be flat. In this case, a distance between the one surface of the second electrical steel plate 302 and the facing magnet 320 may be constant even when the magnet 320 moves leftward or rightward. However, although the one surface of the second electrical steel plate 303 may also be inclined such that a distance between the second electrical steel plate 303 and the magnet 320 increases as the magnet 320 moves rightward, the example of the one surface of the second electrical steel plate 303 being flat like in FIGS. 2 and 3 will be described for the sake of convenience of description.

The first electrical steel plate 302 may extend from the one end 302a such that the other end 302b faces the other end 303b of the second electrical steel plate 303. The other end 303b of the second electrical steel plate 303 may also extend from the one end 303a such that the other end 303b faces the other end 302b of the first electrical steel plate 302.

The other end 302b of the first electrical steel plate 302 and the facing other end 303b of the second electrical steel plate 303 may be separated from each other by a distance a3.

In FIGS. 2 and 3, although the first electrical steel plate 302 and the second electrical steel plate 303 are likely to be provided at a rear side of the magnet 320, the pedal displacement sensor 300 are three dimensionally provided such that the one end 302a of the first electrical steel plate 302 and the one end 303a of the second electrical steel plate 303 face, respectively, the upper side and lower side of the magnet 320, and components of the pedal displacement sensor 300 excluding the magnet 320 may also be provided along circumferential surfaces of the pistons 21a and 22a such that movements of the pistons 21a and 22a and the elastic parts 21b and 22b are not interfered with by the first electrical steel plate 302 or the second electrical steel plate 303.

The magnetic sensor 311 may measure a magnetic flux between the other end 302b of the first electrical steel plate 302 and the other end 303b of the second electrical steel plate 303.

The magnetic sensor 311 may measure a high density magnetic flux as the magnet 320 is moved leftward by a pedal effort from a driver.

Figure 4:
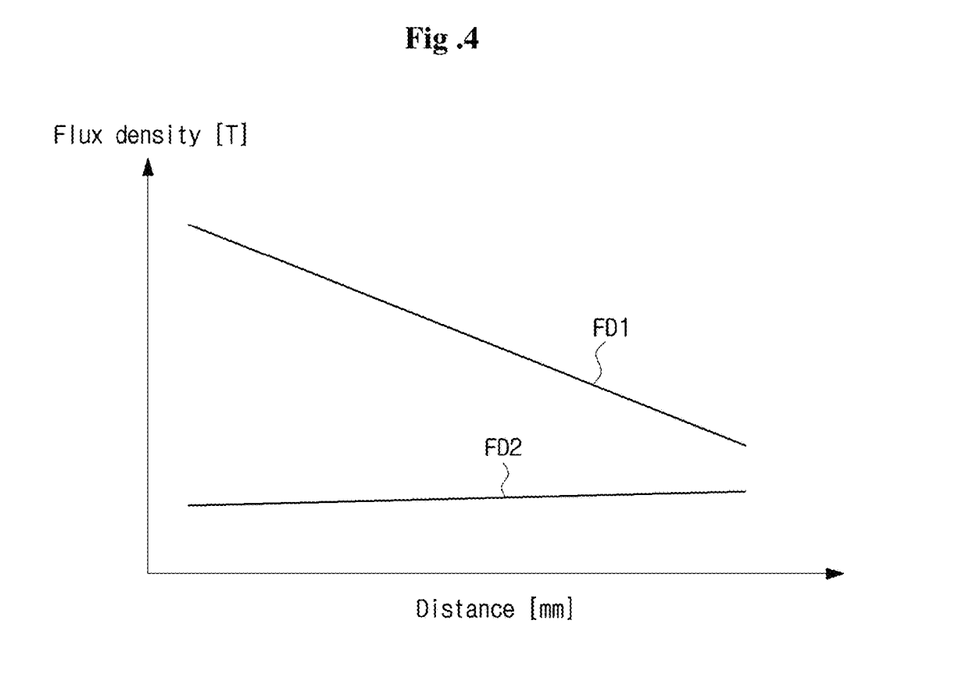
FIG. 4 is a graph showing a density of a magnetic flux according to a movement direction of a magnet.

FIG. 4 is a graph showing a density of a magnetic flux according to a movement direction of a magnet.

Specifically, referring to FIG. 4, as the magnet 320 moves leftward (a distance decreases), a magnetization degree of the first electrical steel plate 302 increases (a flux density of FD1 increases) since the distance between the one end 302a of the first electrical steel plate 302 and the magnet 320 decreases, a magnetization degree of the second electrical steel plate 303 is constant (a flux density of FD2 is constant) since the distance between the one end 303a of the second electrical steel plate 303 and the magnet 320 is constant, a difference in magnetization degree between the first electrical steel plate 302 and the second electrical steel plate 303 increases, and thus a magnetic flux between the other end 302b of the first electrical steel plate 302 and the other end 303b of the second electrical steel plate 303 increases.

In addition, the magnetic sensor 311 may measure a low magnetic flux as the magnet 320 is moved rightward by a driver removing a pedal effort.

Specifically, referring to FIG. 4, as the magnet 320 moves rightward (a distance increases), a magnetization degree of the first electrical steel plate 302 decreases (the flux density of the FD1 decreases) since the distance between the one end 302a of the first electrical steel plate 302 and the magnet 320 increases, a magnetization degree of the second electrical steel plate 303 is constant (the flux density of the FD2 is constant) since the distance between the one end 303a of the second electrical steel plate 303 and the magnet 320 is constant, a difference in magnetization degree between the first electrical steel plate 302 and the second electrical steel plate 303 decreases, and thus a magnetic flux between the other end 302b of the first electrical steel plate 302 and the other end 303b of the second electrical steel plate 303 decreases.

Further referring to FIGS. 2 and 3, information related to a magnetic flux measured by the magnetic sensor 311 may be transmitted to the electronic control unit 2000. The electronic control unit 2000 may determine a displacement of the brake pedal 10 on the basis of the measured magnetic flux. For example, the electronic control unit 2000 may determine that a pedal effort applied to the brake pedal 10 by a driver increases as the measured magnetic flux increases.

The magnetic sensor 311 may be mounted on the printed circuit board 310, and although not illustrated in the drawings, the electronic control unit 2000 described with reference to the FIG. 1 may also be mounted on the printed circuit board 310. As the magnetic sensor 311 and the electronic control unit 2000 are mounted on the single printed circuit board 310, an additional connector for electrically connecting the pedal displacement sensor 300 and the electronic control unit 2000 is not needed. Accordingly, the electronic brake system 1 may be easily packaged.

As is apparent from the above description, since a magnetization degree of an electrical steel plate is changed according to a distance between a magnet and the electrical steel plate, a varying magnetic flux can be generated according to a position of a brake pedal, and a displacement of the pedal can be measured on the basis of a measured magnetic flux.

In addition, since a pedal displacement sensor can be formed with only the magnet, the electrical steel plate, and a magnetic sensor, the electronic brake system can be easily packaged.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A pedal displacement sensor comprising:
   a magnet configured to be movable;
   a first electrical steel plate including one end spaced apart from a first side of the magnet and one surface configured to face the magnet;
   a second electrical steel plate including one end spaced apart from a second side of the magnet and the other end spaced apart from the other end of the first electrical steel plate; and
   a magnetic sensor configured to measure a magnetic flux between the other end of the first electrical steel plate and the second electrical steel plate,
   wherein the one surface of the first electrical steel plate is inclined such that a distance between the one surface of the first electrical steel plate and the magnet increases in one direction.

2. The pedal displacement sensor of claim 1, wherein the second electrical steel plate includes one flat surface configured to face the magnet.

3. The pedal displacement sensor of claim 1, wherein the magnet is able to be moved transversally by a pedal effort from a driver.

4. The pedal displacement sensor of claim 3, wherein the magnetic sensor measures a large magnetic flux as the magnet moves in another direction.

5. The pedal displacement sensor of claim 1, wherein one pole of the magnet faces the one surface of the first electrical steel plate, and the other pole of the magnet faces one surface of the second electrical steel plate.

6. The pedal displacement sensor of claim 1, further comprising a printed circuit board on which the magnetic sensor is mounted.

7. An electronic brake system comprising:
a brake pedal;
a pedal displacement sensor configured to measure a pedal effort applied to the brake pedal by a driver; and
an electronic control unit configured to drive a motor on the basis of a measurement result of the pedal displacement sensor,
wherein the pedal displacement sensor includes
a magnet configured to be able to be moved by the pedal effort from the driver,
a first electrical steel plate including one end spaced apart from a first side of the magnet and one inclined surface configured to face the magnet;
a second electrical steel plate including one end spaced apart from a second side of the magnet and the other end spaced apart from the other end of the first electrical steel plate; and
a magnetic sensor configured to measure a magnetic flux between the other end of the first electrical steel plate and the second electrical steel plate,
wherein the one surface of the first electrical steel plate is inclined such that a distance between the one surface of the first electrical steel plate and the magnet increases as the magnet moves in one direction.

8. The electronic brake system of claim 7, wherein the second electrical steel plate includes one flat surface configured to face the magnet.

9. The electronic brake system of claim 7, wherein the magnet is able to be moved transversally by the pedal effort from the driver.

10. The electronic brake system of claim 9, wherein the magnetic sensor measures a large magnetic flux as the magnet moves in another direction.

11. The electronic brake system of claim 7, wherein one pole of the magnet faces the one surface of the first electrical steel plate, and the other pole of the magnet faces one surface of the second electrical steel plate.

12. The electronic brake system of claim 7, wherein the pedal displacement sensor further includes a printed circuit board on which the magnetic sensor and the electronic control unit are mounted.

* * * * *